US012491659B2

(12) United States Patent
Incerti

(10) Patent No.: US 12,491,659 B2
(45) Date of Patent: Dec. 9, 2025

(54) PROCESS FOR FORMING TILES AND ISOSTATIC PUNCH FOR FORMING TILES

(71) Applicant: XTILE S.R.L., Sassuolo (IT)

(72) Inventor: Dealmo Incerti, Fiorano Modenese (IT)

(73) Assignee: XTILE S.R.L., Sassuolo (IT)

( * ) Notice: Subject to any disclaimer, the term of this patent is extended or adjusted under 35 U.S.C. 154(b) by 46 days.

(21) Appl. No.: 18/513,674

(22) Filed: Nov. 20, 2023

(65) Prior Publication Data

US 2025/0162196 A1 May 22, 2025

(51) Int. Cl.
*B28B 3/02* (2006.01)
*B28B 3/00* (2006.01)
*B30B 5/02* (2006.01)

(52) U.S. Cl.
CPC .............. *B28B 3/003* (2013.01); *B28B 3/027* (2013.01); *B30B 5/02* (2013.01)

(58) Field of Classification Search
CPC ...................................................... B28B 3/003
See application file for complete search history.

(56) References Cited

U.S. PATENT DOCUMENTS 4,704,082 A * 11/1987 Buhler ...................... B30B 5/02 425/389
5,330,346 A * 7/1994 Scardovi ............... B30B 15/024 249/82
6,309,206 B1 * 10/2001 Cassani ................... B28B 3/022 425/432
7,553,149 B2 * 6/2009 Tagliati ................... B28B 3/024 425/405.2
9,289,827 B2 * 3/2016 Voice .................... B30B 11/001
2003/0049349 A1 * 3/2003 Rivola .................... B28B 3/003 425/405.2

FOREIGN PATENT DOCUMENTS

| | | | | | |
|---|---|---|---|---|---|
| BR | MU8700950 | U2 | * 3/2009 | |
| CN | 106626020 | A | * 5/2017 | B28B 3/003 |
| CN | 214419097 | U | * 10/2021 | B28B 3/003 |
| DE | 102013103266 | A1 | * 10/2014 | B28B 3/003 |
| EP | 0605096 | A1 | * 7/1994 | B30B 15/067 |
| EP | 0659527 | A1 | * 6/1995 | B28B 17/0072 |
| EP | 1637315 | A1 | * 3/2006 | B30B 15/067 |
| EP | 2548707 | A1 | * 1/2013 | B28B 3/02 |
| EP | 3342586 | A1 | * 7/2018 | B30B 11/00 |
| EP | 3862506 | A1 | * 8/2021 | E04F 13/142 |
| FR | 2971969 | A1 | * 8/2012 | B41F 16/008 |
| IT | MI940875 | A1 | * 11/1995 | |
| IT | 1257658 | B | * 2/1996 | B28B 3/003 |
| IT | 1257667 | B | * 2/1996 | B28B 3/003 |
| IT | 201600079937 | A1 | * 1/2018 | B28B 7/346 |

(Continued)

*Primary Examiner* — Benjamin A Schiffman
(74) *Attorney, Agent, or Firm* — Rivka Friedman

(57) ABSTRACT

Process for forming tiles which provides for pressing a building material in a cell of a mold of a press by means of an isostatic punch, in which the punch has a compaction surface that is elastically deformable and provided with projections in order to attain cavities on an internal face of a tile and with recesses in order to shape feet projecting on the internal face, in which such punch comprises means for feeding a pressurized fluid and a pressure compensation circuit shaped in order to form pockets of the aforesaid fluid at the recesses.

5 Claims, 4 Drawing Sheets

(56) References Cited

FOREIGN PATENT DOCUMENTS

| | | | | | |
|---|---|---|---|---|---|
| IT | 201600080069 | U1 | * | 1/2018 | |
| IT | 201700036509 | A1 | * | 10/2018 | ............. B30B 11/02 |
| IT | 102020000002557 | B1 | * | 3/2022 | |
| JP | H07232315 | A | * | 9/1995 | ............. B28B 3/003 |
| JP | H0880517 | A | * | 3/1996 | ............. B28B 3/003 |
| JP | H08108418 | A | * | 4/1996 | ............. B28B 3/003 |
| JP | H10337719 | A | * | 12/1998 | ............. B28B 3/003 |

* cited by examiner

PROCESS FOR FORMING TILES AND ISOSTATIC PUNCH FOR FORMING TILES

BACKGROUND OF THE INVENTION

Field of the Invention

The present invention refers to a process for forming tiles and to an isostatic punch for forming tiles.

The present process and punch are generally inserted in the industrial field of production of tiles, in particular made of ceramic material, and are employed for the compaction of a building material made of powder, in particular clay powder, in presses provided with opposite molds, in which one of the two molds carries, mounted thereon, the aforesaid punch.

The present process and isostatic punch are therefore inserted in the field of attaining machinery for the ceramics industry, in particular for the production of tiles.

Description of Related Art

In accordance with the prior art, tiles are attained by compacting clay powders or granules that are usually in atomized form (generically indicated with the term “earth” in the technical jargon of the field and hereinbelow with the term powders for the sake of simplicity) within a shaped chamber that remains defined between two opposite molds of a press.

More in detail, the press comprises a first mold provided with a plurality of cells, each of which intended to be filled with the clay powder for forming a corresponding tile. In addition, the press comprises an opposite second mold, which is provided with a plurality of punches intended to act on the clay powder deposited in the corresponding cells of the first mold so as to compact the powder in order to shape corresponding tiles.

The tile made of compacted powder in the shape, in the size and the design desired, is therefore subjected to a firing process in oven in which it becomes rigid and mechanically strong.

A problem that is felt quite strongly by the tile producers is connected to the need to reduce the density non-uniformities present in the compacted powders in each cell in order to prevent that, during the subsequent firing step, there are different thermal responses in the areas with different density and hence different size shrinkage with consequent undesired deformations in the finished product. Such non-uniformities can depend on a certain non-homogeneity intrinsic in the powders and on the difficulty of loading the cells in a uniform manner.

In order to overcome these drawbacks, punches have been attained, so-called “isostatic”, which provide for the use of pressurized oil in order to balance the pressures on different and predetermined areas of the punch during the pressing of the powders loaded in the corresponding cells of the press.

More in detail, with reference to the example of the prior art illustrated in figure 1A, the isostatic punches of known type comprise a rigid support body A (e.g. made of steel) provided with a rear surface, intended to be fixed to the second mold of the press (that opposite the first mold on which there are the cells), and with a front surface on which a containment tank is obtained that is delimited by a bottom wall B and by a perimeter wall belonging to the aforesaid support body A. Housed in such containment tank is a compaction body C made of polyurethane elastomeric resin, which substantially fills the volume of the containment tank and is fixed to the bottom wall B and to the perimeter wall placed to delimit the containment tank by means of a glue.

The compaction body C is frontally provided with a compaction surface D intended to come into contact with the clay powder for the compaction of the latter and for forming the shape of the tile E to be attained.

The isostatic punch is also provided with a compensation circuit F of the pressure which is extended within the containment tank D and which is connected to means for feeding oil under pressure.

More in detail, such compensation circuit F of the pressure is extended within the containment tank in specific areas at which it is desired to make uniform the pressure which is extended during the closure of the molds of the press. In particular, when the molds of the press are closed against each other, the pressure which the isostatic punch exerts on the clay powders to be compacted is distributed, by the oil present in the compensation circuit F, in a uniform manner on the compaction surface D of the compaction body E. Therefore, during use, the pressurized oil within the compensation circuit F will flow from the zones of the same compensation circuit F corresponding to parts of compaction surface D that are compressing denser clay powder towards the zones of the same compensation circuit F corresponding to parts of compaction surface D that are compressing less dense clay powder, so as to bring all the clay powder inside the cell of the press substantially at the same density.

In particular, the cell on the first mold is arranged for shaping the visible face N of the tile E that is formed, while the compaction surface D on the isostatic punch is arranged for shaping the rear face H (known with the term “mark” in the technical jargon of the field) of the aforesaid tile E. In order to shape such rear face H, the compaction surface D is provided with projecting portions I that are substantially square, which occupy most of the compaction surface D itself and are adapted to compact the clay powders or granules so as to make the cavities on the rear face H itself, and with recesses L, which are adapted to form abutment feet or ribs M projecting on the rear face H of the aforesaid tile E, in a manner such that the rear face or “mark” of the tile has for example a structure with straight or diagonal grid or a honeycomb cell structure.

The compensation circuit F of the pressure is extended within the containment tank of the support body A of the isostatic punch at the projecting portions I of the compaction surface D, in a manner such that, when the pressurized oil is provided to the compensation circuit F, pockets G of pressurized oil are formed at the projecting portions I which deform the same compaction body C, increasing the compression force that the projecting portions I themselves exert on the clay powders and making uniform the aforesaid compression force at all the aforesaid projecting portions I. In this manner, most of the rear face H of the tile E therefore is uniformly compacted and, consequently, most of the entire tile E (the bottom of the cavities formed by the projecting portions I is planar and occupies most of the rear face H, in light of the fact that the projecting portions I are square and occupy most of the compaction surface D).

The solution of the prior art isostatic punch has in practice shown that it does not lack drawbacks.

The main drawback lies in the fact that such isostatic punch is not able to correctly form tiles that have a thinned main body (i.e. that on which the visible face is extended) and abutment feet or ribs with high thickness in comparison to that of the main body.

Therefore, the isostatic punch, and thus the process of forming tiles that employs such isostatic punch, are unable to provide tiles that have reduced mass with a high ratio between void volume and solid volume, where the void and solid volumes are expressed in percentages of volume over the overall bulk volume occupied by the tile I itself.

Consequently, the tile thus obtained must be subjected to processes of drying and firing with high energy expenditure.

A further drawback lies in the fact that such isostatic punch of the prior art and the process that employs it are unable to sufficiently compress the clay of the tile at the abutment feet or ribs and, thus, if such abutment feet or ribs are provided with high thickness, they would respond to the drying and firing treatments in a manner that is different from the other parts of the tile that are more compacted and would be more easily subjected to breakage.

BRIEF SUMMARY OF THE INVENTION

In this situation, the problem underlying the present invention is therefore that of overcoming the drawbacks manifested by the solutions of known type, by providing a process for forming tiles and an isostatic punch for forming tiles, which allow forming tiles with abutment feet having greater height than those of the tiles attained by means of processes and isostatic punches of the prior art.

A further object of the present invention is to provide a process and an isostatic punch for forming tiles, which allow forming tiles with reduced mass with respect to that of the tiles attained by means of processes and isostatic punches of the prior art.

A further object of the present invention is to provide a process and an isostatic punch for forming tiles, which allow forming tiles with ratio of void volume over solid volume (where the void and solid volumes are expressed in a percentage over the overall bulk volume occupied by the tile) that is greater than that of the tiles attained by means of processes and isostatic punches of the prior art.

A further object of the present invention is to provide a process and an isostatic punch for forming tiles, which allow forming tiles that can be subjected to drying and firing with lower energy expenditure than the tiles attained by means of processes and isostatic punches of the prior art.

A further object of the present invention is to provide a process and an isostatic punch for forming tiles, which is entirely reliable in operation.

BRIEF DESCRIPTION OF THE DRAWINGS

The technical characteristics of the invention, according to the aforesaid objects and the advantages thereof, will be more evident in the following detailed description, made with reference to the enclosed drawings, which represent a merely exemplifying and non-limiting embodiment of the invention in which.

DETAILED DESCRIPTION

Figure 1A:
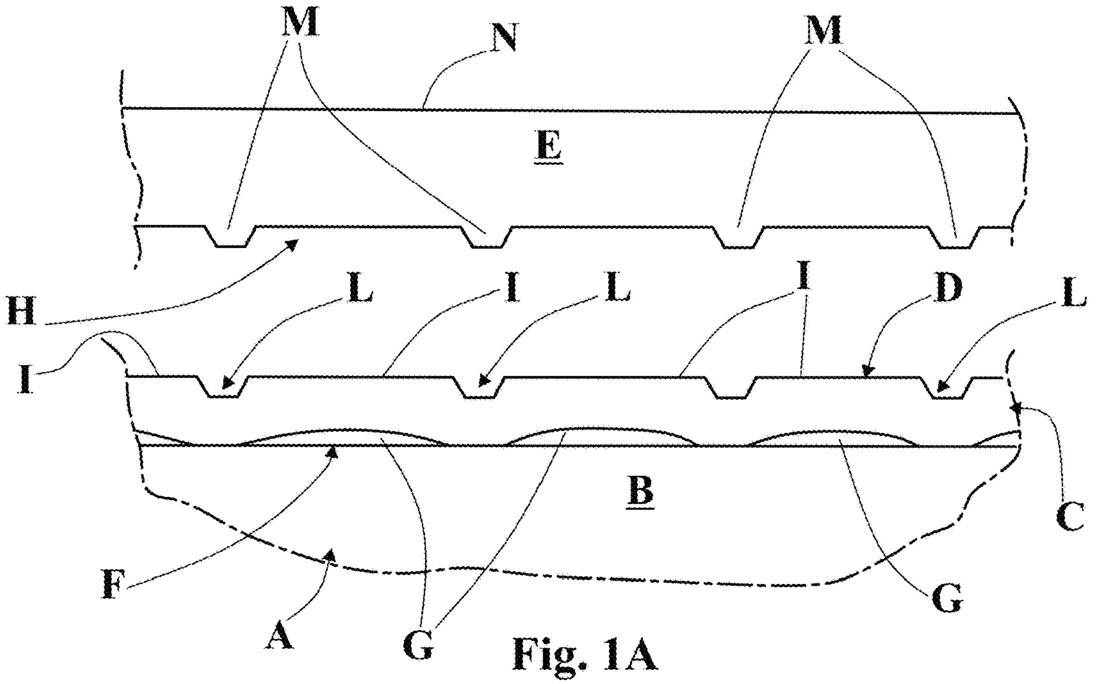
FIG. 1A shows an example of isostatic punches of the prior art.
Figure 1B:
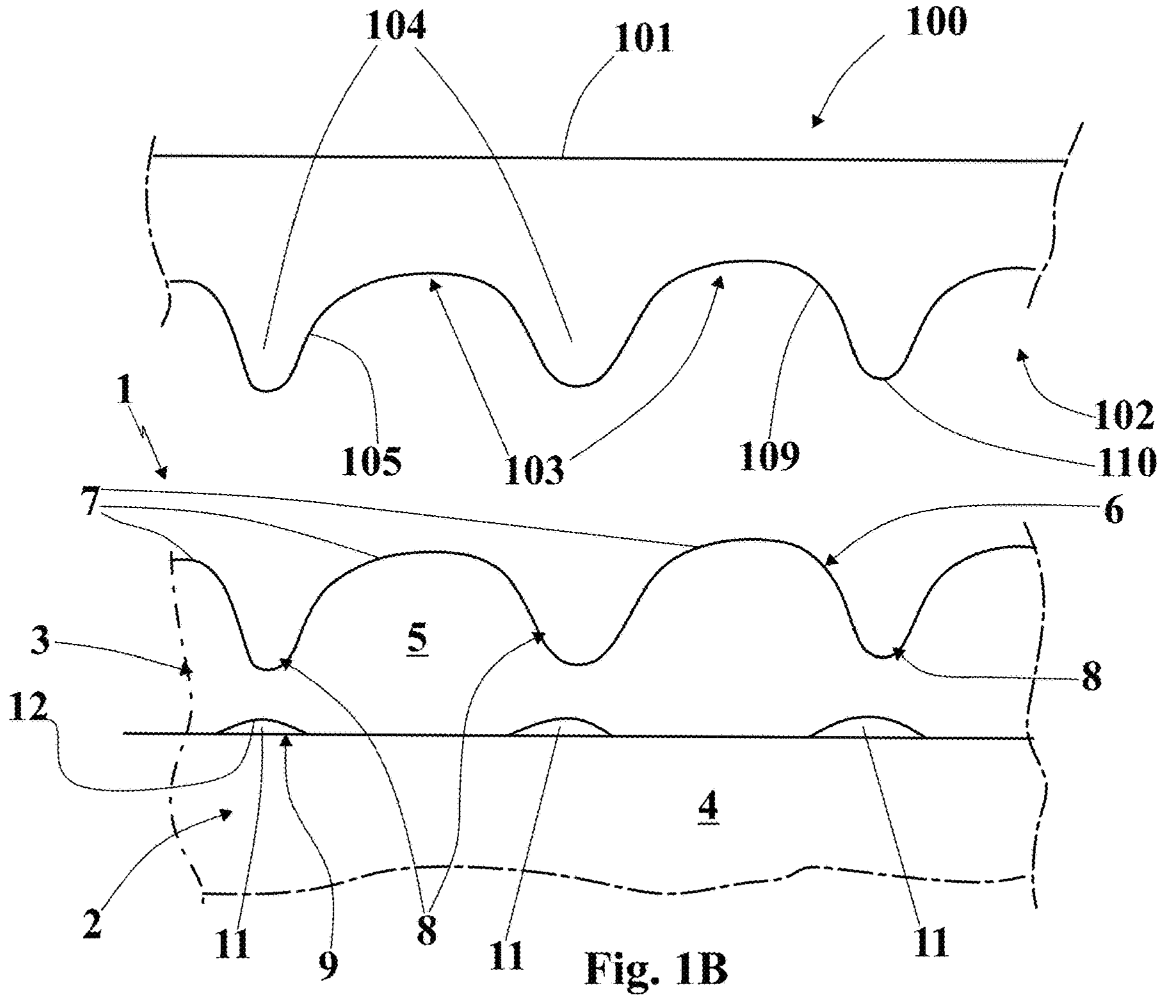
FIG. 1B shows a side schematic view of an isostatic punch, object of the present invention, employed in the process for forming tiles that is in turn the object of the present invention.
Figure 2:
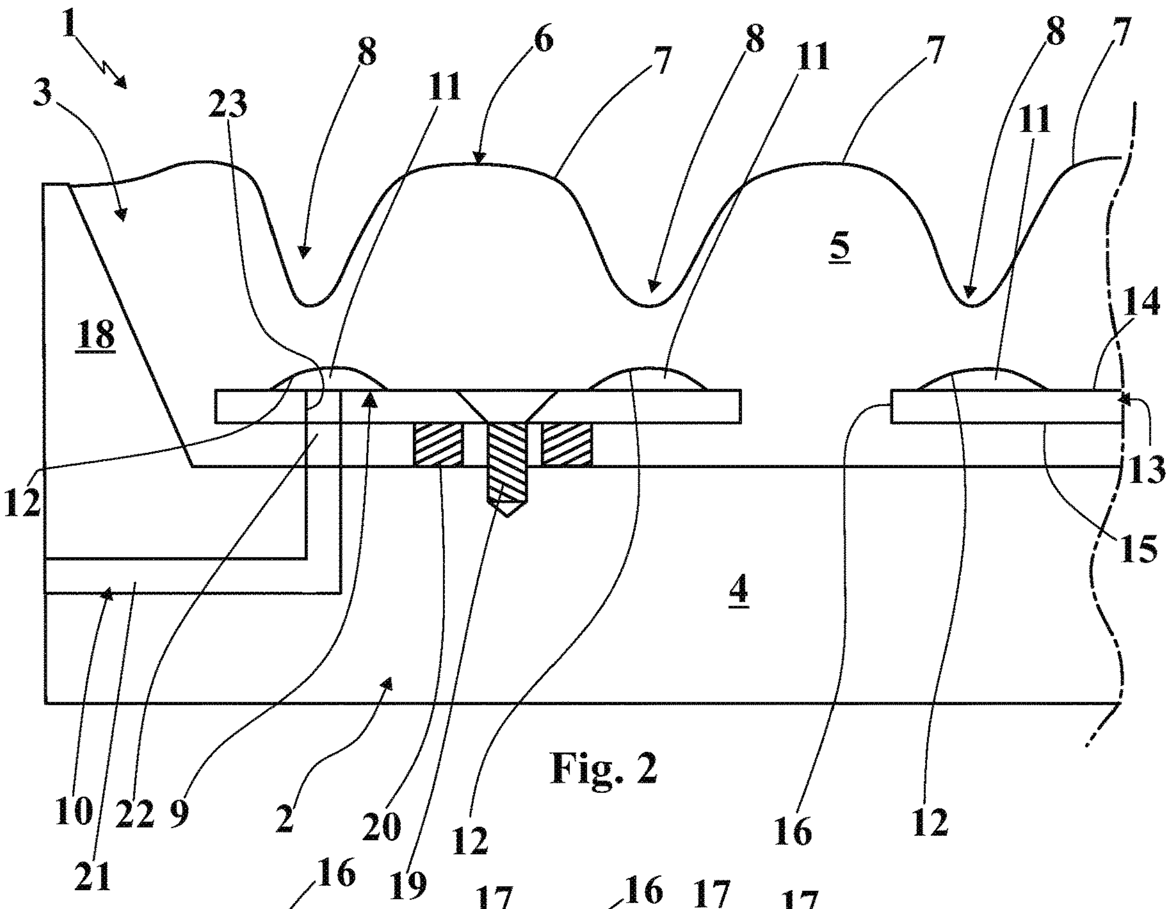
FIG. 2 shows a side schematic view of a preferred embodiment of an isostatic punch, object of the present invention, employed in the process for forming tiles that is in turn the object of the present invention.

With reference to the figures of the enclosed drawings, reference number 1 overall indicates an isostatic punch for forming tiles 100, in particular ceramic tiles, object of the present invention, which is employable in the process for forming tiles 100 that is in turn the object of the present invention.

The present isostatic punch 1 for forming tiles 100, in particular ceramic tiles, is advantageously intended to be installed on a first mold 201 of a press 200, and such first mold 201 is in particular opposite a second mold 202 of the same press 200 on which at least one cell 203 is obtained for containing a powder building material 204. In particular, such powder building material 204 is clay powder, but it can also be a different material, such as for example a cement material, an ash-based recovery material or similar base, i.e. any one material that can be compacted in order to form a tile from its powders. Such press 200 is also advantageously actuatable between an open configuration, in which the molds are spaced from each other, and a closed configuration, in which the molds are placed against each other in a manner such that the present isostatic punch 1 can compact the powder building material 204 placed in the cell 203 and thus form a tile 100.

The present isostatic punch 1 comprises a support body 2 in which a containment tank 3 is contained, which is delimited at least by a bottom wall 4.

Advantageously, the support body 2, in addition to comprising the aforesaid bottom wall 4 placed to delimit the containment tank 3, also comprises a perimeter wall 18, which is extended projecting from the bottom wall 4 and delimits, together therewith, the containment tank 3 and, preferably, is made in a single body with the same bottom wall 4.

In addition, the present isostatic punch 1 comprises a compaction body 5 made of elastically deformable material, placed in the containment tank 3 and having a compaction surface 6, which is opposite the bottom wall 4 and is intended to come into contact with a powder building material 204 (e.g. clay) placed in a cell 203 of a second mold 202 of the press 200 opposite the first mold 201 (on which the same isostatic punch 1 is intended to be installed), in a manner such to be able to compact the aforesaid building material 204 in the cell 203.

Such compaction surface 6 is provided with a plurality of projecting portions 7, which are arranged for forming corresponding cavities 103 on an internal face 102 of a tile 100 opposite a visible face 101 of the same tile 100, and with a plurality of recesses 8, which are interposed between the projecting portions 7 and are arranged for forming corresponding feet 104 projecting on the internal face 102 of the aforesaid tile 100.

More in detail, the internal face 102 of the tile 100 is generally named, in the technical jargon of the field, with the term "mark" and is opposite the visible face 101 of the same tile 100, and such visible face 101 is, in particular, that intended to be decorated for example by glazing, in a manner such to increase the aesthetic value.

In particular, the tiles 100 thus produced are intended to be fixed to a building wall at their internal face 102 or "mark", in a manner such to attain a cover on the aforesaid building wall.

The compaction body 5 is for example made of a polyurethane elastomeric resin and, in particular, is made by pouring the aforesaid polyurethane elastomeric resin in gel form within the containment tank 3 of the support body, shaping the compaction surface 6 by means of a mask reproducing the internal face 102 of the tile 100 to be formed and activating the crosslinking process of the resin itself.

More in detail, the projecting portions 7 and the recesses 8 are shaped in a manner such that the aforesaid feet 104 are extended projecting between a base portion 109 and an opposite tip portion 110 and, preferably, are provided with a lateral surface 105 extended tapered from the base portion 109 to the tip portion 110, in order to facilitate the extraction of the tile 100 itself from the press 200.

In addition, preferably, the projecting portions 7 and the recesses 8 are shaped in a manner such that contiguous feet 104 placed to delimit a same cavity 103 are joined together by connection walls having height substantially equal to or lower than that of the feet 104 themselves.

In addition, the isostatic punch 1 according to the invention comprises a compensation circuit 9 placed within the containment tank 3 of the support body 2, interposed between the bottom wall 4 of the containment tank 3 of the aforesaid support body 2 and the compaction surface 6 of the compaction body 5. The isostatic punch 1 according to the invention also comprises feeding means 10, which are placed in fluid communication with the compensation circuit 9 and are arranged for feeding it with a pressurized fluid, e.g. pressurized oil.

Advantageously, the feeding means 10 comprise one or more feed ducts 21, which are obtained in the support body 2 and are placed in fluid communication with the compensation circuit 9 within the containment tank 3, and a source of pressurized fluid (not illustrated), which is placed in fluid connection with the aforesaid one or more feed ducts 21 in order to provide therethrough the pressurized fluid to the compensation circuit 9.

According to the idea underlying the present invention, the compensation circuit 9 is extended at at least part of the recesses 8 of the compaction surface 6 of the compaction body 5 and the feeding means 10 are actuatable in order to provide, to such compensation circuit 9, the pressurized fluid and form pockets 11 of pressurized fluid at at least part of the recesses 8 of the compaction surface 6 of the compaction body 5.

More in detail, the fact that the compensation circuit 9 is extended at at least part of the recesses 8 ensures that, when the feeding means 10 are actuated in order to provide the pressurized fluid, pockets 11 of pressurized fluid are formed at such recesses 8, in a manner such that the compression that is exerted on the building material 204 (e.g. clay) by the compaction surface 6 at the aforesaid recesses 8 is increased and, therefore, at the feet 104 of the tile 100 that is formed by compacting such building material 204. Indeed, if the formation of pockets 11 at the recesses 8 was not provided for, the tile 100 would be subjected to high compression by the projections 7 of the compaction surface 6 in order to form the cavities 103 while it would be subjected to a much lower compression by the recesses 8 that form the feet 104. Instead, the arrangement of a compensation circuit 9 as provided by the invention (i.e. that is extended at the recesses 8 and comes to form, when fed by the feeding means 10, the pockets 11 of pressurized fluid at the aforesaid recesses 8) allows increasing the compression that is exerted by the compaction surface 6 at the same recesses 8, in a manner such to render it as uniform as possible with that exerted by the projections 7 of the same compaction surface 6.

In this manner, the tile 100 that is formed by means of the isostatic punch 1 according to the invention can have feet 104 with height greater than that of the tiles attained by means of the isostatic punches of the prior art, and such feet 104 being correctly compacted do not run particular risks of breakage.

In particular, the tile 100 that is formed by means of the isostatic punch 1 can have a first thickness D1 between visible face 101 and internal face 102 at the feet 104 greater than 50% or more with respect to a second thickness D2 of the same tile 100 between visible face 101 and internal face 102 at the cavities 103.

Therefore, the first thickness D1 at the feet 104 of the tile 100 produced by means of the present isostatic punch 1 being so high with respect to the second thickness D2 at the cavities 103 of the same tile 100, the isostatic punch 1 according to the invention advantageously allows producing the tiles 100 that have reduced mass and a high ratio between void volume and solid volume (in which the void and solid volumes are expressed as a percentage over the overall bulk volume of the tile 100 itself), with the consequence that the tiles 100 produced by means of the present isostatic punch 1 can be subjected to drying and firing processes with low energy expenditure.

In addition, the possibility of attaining, by means of the present isostatic punch 1, the tiles 100 with first thickness D1 at the feet 104 so high with respect to that at the cavities 103 ensures that the feet 104 of such tiles 100 delimit, with the other adjacent feet 104, containment volumes 106 susceptible of containing at least one dose of filler material 108 different from ceramic material.

Such filler material can for example be a sound-absorbent material and/or thermal insulation material and/or dehumidifying material and/or refractory material, in particular depending on the particular use destination that one wishes to confer to the building wall cover formed by the tiles 100.

In this manner, by employing the tiles 100 produced by means of the present isostatic punch 1 and provided with doses of filler material 108 in their containment volumes 106, it is possible to attain insulation covers (against heat exchange and/or sound) and/or fireproof covers on building walls, without the need to install panels of insulation and/or fireproof material between the building wall and the cover formed by the tiles 100 themselves.

This advantageously allows attaining insulation and/or fireproof covers on the building walls in a simple and quick manner, since it is not necessary to fix to the wall one or more layers of panels made of insulation and/or fireproof material and then above the latter fix the tiles, but it is possible to directly fix to the building wall the tiles 100 produced by means of the present isostatic punch 1 and that advantageously already contain the doses of filler material 108 in their containment volumes 106.

Additionally, in light of the fact that doses of filler material 108 can be directly placed in the containment volumes 106 of the tiles 100, it is possible to attain insulation and/or fireproof covers by means of the aforesaid tiles 100 (produced by employing the present isostatic punches 1) which are particularly thin, without however giving up the performance capabilities, with the consequence that covers can be made by means of the aforesaid tiles 100 also on the building walls of the internal settings of a building without having to excessively reduce the space within the aforesaid settings.

Differently than the covers for building walls, which are advantageously attained with ceramic tiles 100 obtained starting from clay and attained by means of the present isostatic punch 1, it is possible to employ the tiles 100 obtained by means of the aforesaid present isostatic punch 1 also in order to cover walkways, sidewalks, terraces and the like, in particular if such tiles 100 were obtained starting from a cement material.

Advantageously, the projecting portions 7 and the recesses 8 of the compaction surface 6 of the compaction body 5 are rounded, with the consequence that the cavities 103 and the feet 104 on the internal face 102 of the tile 100 that is formed are in turn rounded.

In particular, the arrangement of projecting portions 7 and rounded recesses 8 ensures that the feet 104 are extended starting from their base portion 109 with a substantially frustoconical lateral surface 105 and terminate with their tip portions 110 having rounded form.

More in detail, the fact that the projecting portions 7 and the recesses 8 are rounded ensure that the feet 104 of the tile 100 that is formed are not subjected to compression only along the main extension direction of the same feet 104, but also transverse to such main extension direction, in a manner such that the feet 104 are subjected to compression laterally also at their lateral surface 105. In this manner, the amount of the compression to which the feet 104 are subjected is made as uniform as possible with the compression to which the tile 100 is subjected at the cavities 103, in a manner such that the response of the tile 100 to subsequent processing (drying, firing, etc.) is as uniform as possible both at the cavities 103 and at the feet 104.

Advantageously, the compaction body 5 is provided with an interface surface 12 directed towards the bottom wall 4 of the containment tank 3 of the support body 2 and placed at least partially to delimit the compensation circuit 9. In addition, the feeding means 10 are advantageously actuatable in order to form the pockets 11 of pressurized fluid on the interface surface 12 at at least part of the recesses 8 of the compaction surface 6 of the compaction body 5.

In this manner, the feeding means 10 are arranged for directly deforming the compaction body 5 forming 1*e* pockets 11 of pressurized fluid against the interface surface 12 of the compaction body 5, which, being placed at least to partially delimit the compensation circuit 9, is extended at at least part of the recesses 8 of the compaction surface 6.

Advantageously, the present isostatic punch 1 comprises a rigid plate 13 placed within the compaction body 5, integral with the support body 2, spaced from the bottom wall 4 and provided with a first face 14, which is placed in contact with the interface surface 12 and is directed towards the compaction surface 6 of the compaction body 5, and with an opposite second face 15, which is directed towards the bottom wall 4.

Preferably, the aforesaid plate 13 is fixed to the support body 2, in particular to the bottom wall 4, by means of fixing screws 19.

In addition, such plate 13 is preferably maintained spaced from the aforesaid bottom wall 4 by spacer elements 20, which are interposed between the bottom wall 4 itself and the plate 13 (in particular the second face 15 of the latter), are still more preferably made of metallic material and are for example washers.

In particular, the spacer elements 20 are perforated (being for example washers) and the fixing screws 19 are each placed to traverse a corresponding spacer element 20, in a manner such to maintain in position, at the same time, the rigid plate 13 and the spacer element 20 itself.

Advantageously, the rigid plate 13 comprises multiple through holes 16, which are extended between the first and the second face 14, 15, are placed at least at the projecting portions 7 of the compaction surface 6 of the compaction body 5 and are occupied by the elastically deformable material of the compaction body 5.

In addition, the compensation circuit 9 is extended between the first face 14 of the rigid plate 13 and the interface surface 12 of the compaction body 5 around the through holes 16.

In particular, since the compensation circuit 9 is extended on the first face 14 of the rigid plate 13 spaced from the bottom wall 4, in the compaction body 5 at least one connection channel 22 is obtained that places the feeding means 10 in fluid communication with the compensation circuit 9 itself. Additionally, the one or more feed ducts 21 of the feeding means 10 advantageously lead to the bottom wall 4 and, therefore, one or more corresponding connection channels 22 are preferably obtained within the compaction body 5, which in particular are extended from the bottom wall 4 to the second face 15 of the rigid plate 13 at suitable through openings 23 not occupied by the elastically deformable material of the compaction body 5.

More in detail, such conformation of the plate 13 with through holes 16 placed at the projections 7 and occupied by the elastically deformable material of the compaction body 5 allows delineating, in a structurally simple manner, the compensation circuit 9, without having to dig suitable channels or chambers for the pressurized fluid on the bottom wall 4 or within the compaction body 5. In addition, advantageously, such conformation of the plate 13 renders the compaction body 5 particularly stable on the support body 2, the compaction body 5 having part of its elastically deformable material which occupies the through holes 16 of the plate 13 that is fixed to the support body 2 itself.

Additionally, advantageously, such conformation of the plate 13 also renders the operation of the same isostatic punch 1 particularly simple. Indeed, in operation, it is sufficient to provide the pressurized fluid by means of the feeding means 10 to the compensation circuit 9, in a manner such that the pressurized fluid comes to flow between the first face 14 of the plate 13 and the interface surface 12 of the compaction body 5 and forms pockets 11 of pressurized fluid against the aforesaid interface surface 12 at first areas 17 on the plate 13 itself contiguous with the through holes 16 while it circumvents the elastically deformable material of the compaction body 5 that occupies the through holes 16 themselves at the projections 7. Consequently, the aforesaid pressurized fluid cannot come to form pockets at the projections 7 but increases the compression exerted by the compaction surface 6 forming pockets 11 only at at least part of the recesses 8.

Advantageously, the compensation circuit 9 is extended at a first group of recesses 8 of the compaction surface 6 of the compaction body 5 and is not extended at a second group of recesses 8 of the aforesaid compaction surface 6.

In this manner, only a part of the feet 104, i.e. those at the recesses 8 belonging to the first group, is subjected by the compaction surface 6 to a compression greater than that to which the feet 104 at the recesses 8 belonging to the second group are subjected.

In particular, this involves that some of the feet 104 are less compressed and thus can act as abutment points of the tile 100 on movement means which bring the tile 100 itself from the press 200 (on which the present isostatic punch 1 is advantageously intended to be installed) to the subsequent stations, such as that of drying, of firing, of glazing and the like.

Preferably, the recesses 8 belonging to the second group are distributed in an ordered manner with respect to the recesses 8 belonging to the first group.

Figure 3:
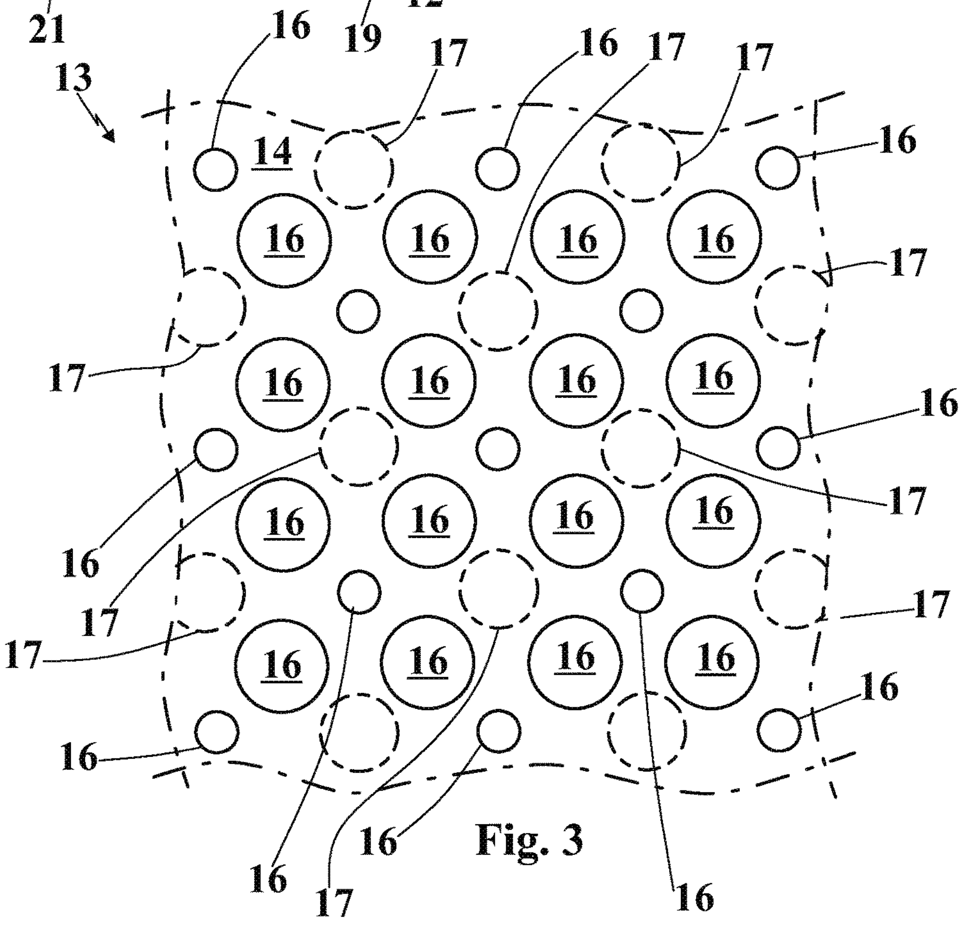
FIG. 3 shows a plan schematic view of a rigid plate of the isostatic punch of FIG. 2.
Figure 4:
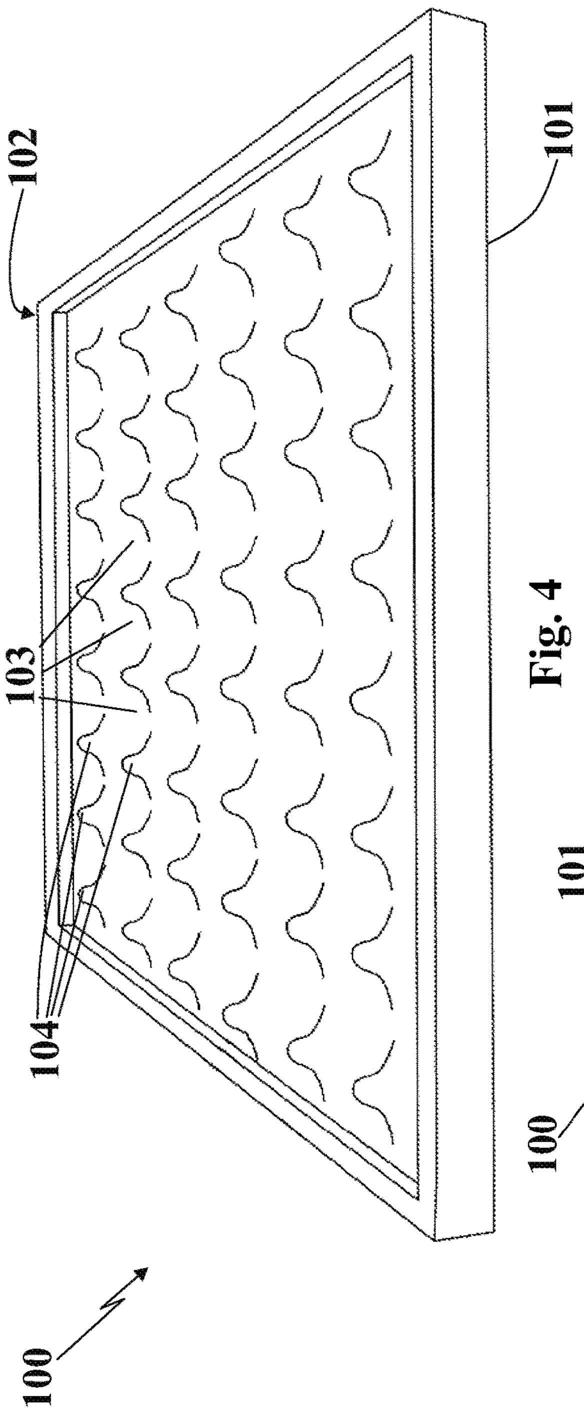
FIG. 4 shows a perspective view of a tile produced by means of the process for forming tiles, object of the present invention.
Figure 5:
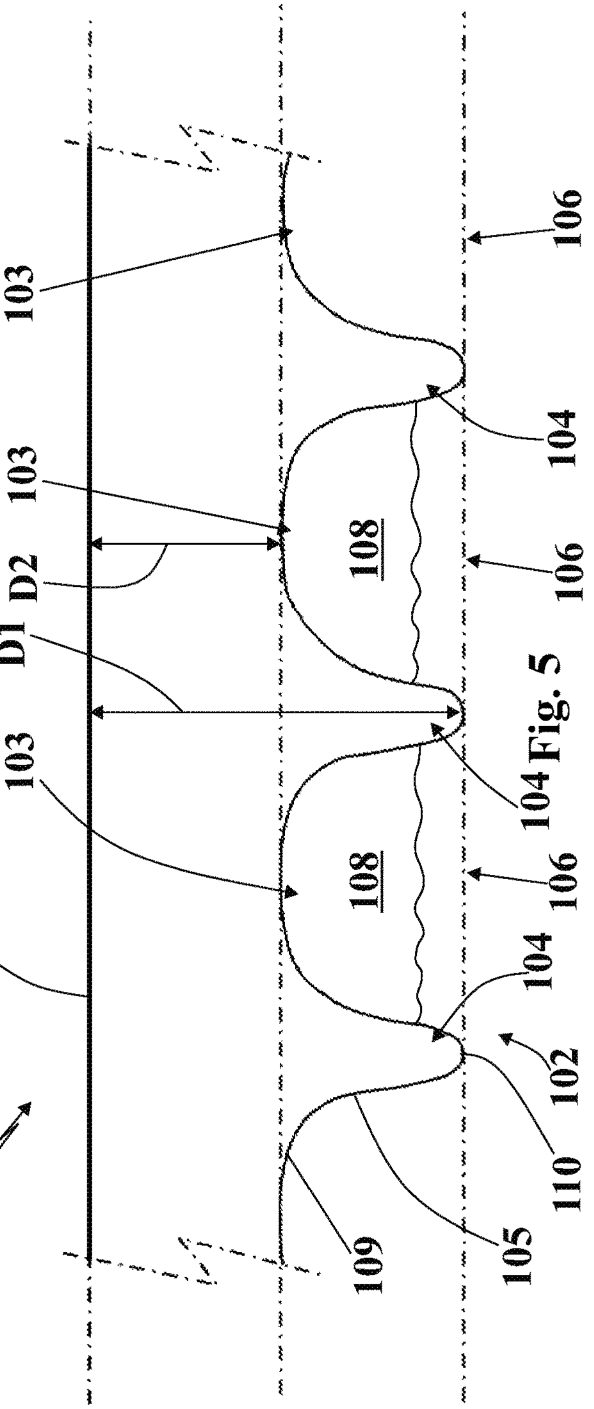
FIG. 5 shows an enlarged detail of a side section view of the tile of FIG. 4, whose side section was obtained along a plane that passes at feet projecting on an internal face of the same tile.
Figure 7:
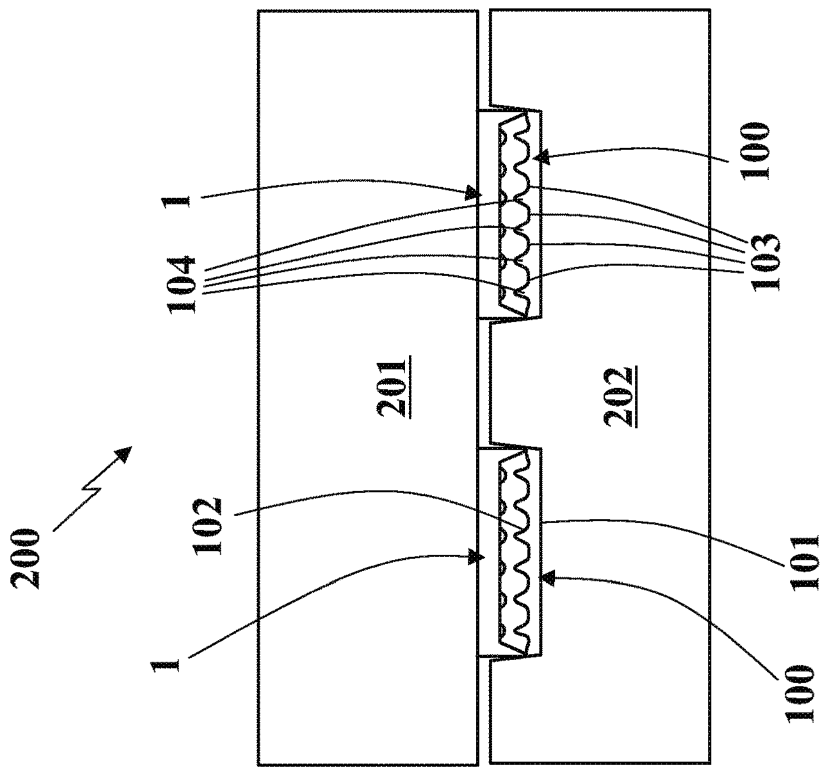
FIG. 7 shows a schematic view of the press of FIG. 6, in closed configuration.
Figure 6:
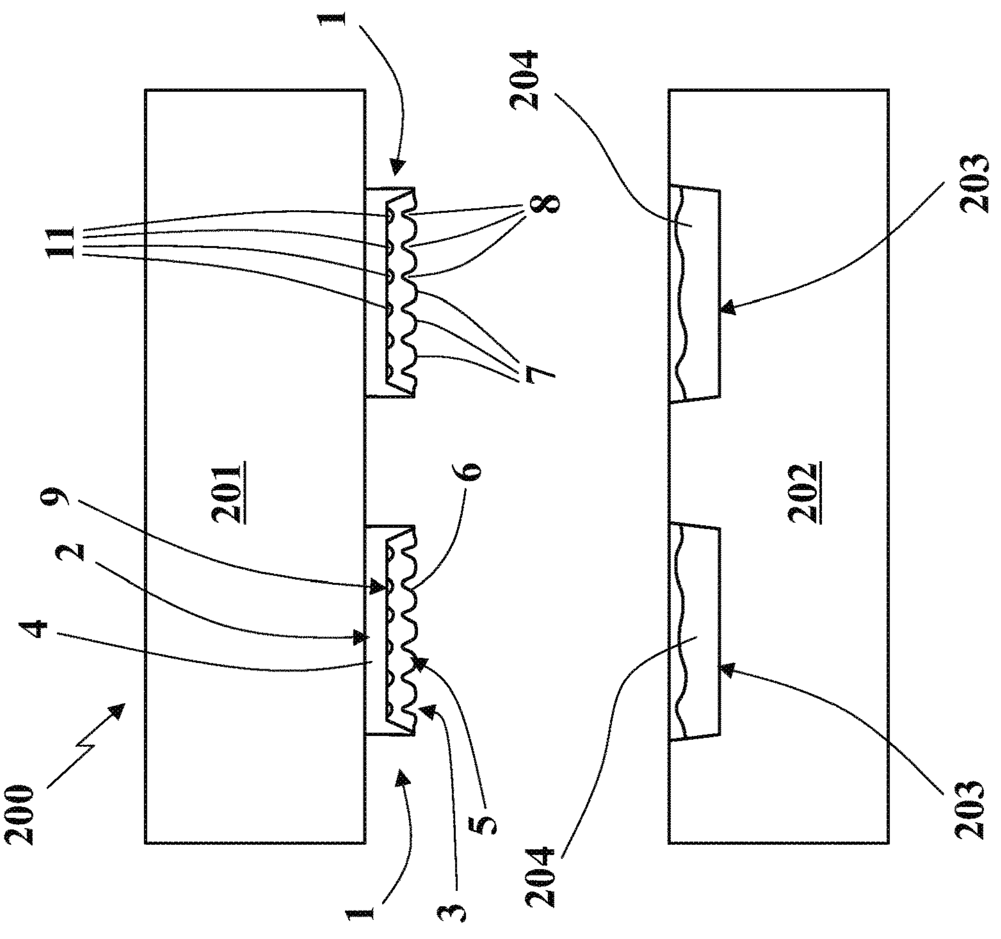
FIG. 6 shows a schematic view of a press, in open configuration, employed in the process for forming tiles, object of the present invention, which carries, mounted thereon, at least one isostatic punch that is in turn the object of the present invention.

For example, in the event in which it is desired to confer to the internal face 102 of the tile 100 a structure with straight grid, like that which can be obtained by employing a rigid plate 13 of the type schematized in FIG. 3, the recesses 8 are aligned with each other according to lines and columns and, along each line and each column, the recesses 8 belonging to the first group are alternated with the recesses 8 belonging to the second group, in a manner such that the feet 104 of the formed tile 100 include one that is more greatly pressed and one less pressed and are alternated with each other.

In particular, in accordance with the schematic example of FIG. 3, in order to separate the recesses 8 between first and second group, through holes 16 are provided at the recesses 8 of the compaction surface 6 belonging to the second group. In this manner, the aforesaid through holes 16 are occupied by the elastically deformable material of the compaction body 5 and, therefore, the compensation circuit 9 is not extended at the recesses 8 at which the through holes 16 are provided and the pressurized fluid supplied by the feeding means 10 circumvents the aforesaid through holes 16, not coming to form the pockets 11 at such recesses 8 of the second group.

Otherwise, in accordance with an embodiment not illustrated in the enclosed figures, the compensation circuit 9 is extended at all the recesses 8 of the compaction surface 6 of the compaction body 5 and the feeding means 10 are actuatable in order to provide the pressurized fluid to such compensation circuit 9 and form pockets 11 of pressurized fluid at all the recesses 8 of the compaction surface 6 of the compaction body 5 (hence without it being possible to make the distinction between recesses 8 of the first and of the second group).

Also forming the object of the present invention is a process for forming tiles 100, in particular ceramic tiles, which employs the isostatic punch 1 described up to now. Of course, the advantages attained by the isostatic punch 1 described up to now are the same advantages that are attained by the process described hereinbelow, which employ the same isostatic punch 1. In addition, the optional and advantageous characteristics of the isostatic punch 1 as described above are referable to the isostatic punch 1 employed in the process in the process described below without having to be repeated, given that the isostatic punch 1 described up to now and that employed in the process described below are the same isostatic punch 1.

The present process provides for a step of arranging a press 200 provided with a first mold 201 carrying, mounted thereon, at least one isostatic punch 1 and with a second mold 202, on which at least one cell 203 is obtained that is intended to receive a building material 204 made of powder.

More in detail, with the expression "building material" it must be intended any material adapted to be pressed in order to obtain a tile, in particular clay so as to obtain ceramic tiles, or even a cement material or a recovery material containing ash. In addition, with the expression "made of powder" it must be intended any one size of the aforesaid building material 204, in which such size can range from fragments with several micrometer size to granules of several millimeter size.

Additionally, in order to produce as many tiles as possible, the second mold 202 of the press 200 employed in the present process is advantageously provided with a plurality of cells 203 and the first mold 201 of the aforesaid press 200 carries, mounted thereon, a corresponding number of isostatic punches 1.

In addition, such press 200 is actuatable between an open configuration, in which the first mold 201 and the second mold 202 are spaced from each other, and a closed configuration, in which the first and the second mold 201, 202 are placed against each other, with the isostatic punch 1 arranged for compacting the powder building material 204 in the cell 203 of the second mold 204 and form a tile 100 provided with a visible face 101 and with an opposite internal face 102.

In particular, with the fact that the press 200 is actuatable between the open configuration and closed configuration, it can be intended that it is the first mold 201 that is moved close to and away from the second mold 202, that it is the second mold 202 that is moved close to and away from the first mold 201 or that it is the first and the second mold 201, 202 that are moved mutually close to and away from each other.

As described above, the isostatic punch 1 comprises a support body 2, in which a containment tank 3 is obtained that is delimited at least by a bottom wall 4 and, advantageously, also by a perimeter wall 18, which is extended projecting from the bottom wall 4 and is, preferably, made integrally with the same bottom wall 4.

The isostatic punch 1 employed in the present process also comprises a compaction body 5 made of elastically deformable material (e.g. polyurethane elastomeric resin), placed in the containment tank 3 and having a compaction surface 6, which is opposite the bottom wall 4 and is intended to come into contact with the powder building material 204 (in particular, in a manner such to compact the aforesaid building material 204 when the press 200 is actuated into closed configuration).

Such compaction surface 6 is provided with a plurality of projecting portions 7, which are arranged for forming corresponding cavities 103 on the internal face 102 of the tile 100, and with a plurality of recesses 8 interposed between the projecting portions 7 and arranged for forming corresponding feet 104 projecting on the internal face 102 of the tile 100.

More in detail, the projecting portions 7 and the recesses 8 are shaped in a manner such that the aforesaid feet 104 are extended projecting between a base portion 109 and an opposite tip portion 110 and, preferably, are provided with a lateral surface 105 extended tapered from the base portion 109 to the tip portion 110, in order to facilitate the extraction of the tile 100 itself from the press 200. Additionally, preferably, the projecting portions 7 and the recesses 8 are shaped in a manner such that contiguous feet 104 placed to delimit a same cavity 103 are joined together by connection walls having height substantially equal to or lower than that of the feet 104 themselves.

Additionally, the isostatic punch 1 employed in the present process comprises a compensation circuit 9 placed within the containment tank 3 of the support body 2, interposed between the bottom wall 4 of the containment tank 3 and the compaction surface 6 of the compaction body 5 and extended at at least part of the recesses 8 of the compaction surface 6.

In addition, such isostatic punch 1 comprises feeding means 10, which are placed in fluid communication with the compensation circuit 9 in order to feed it with a pressurized fluid.

The process according to the invention provides for a loading step, in which, with the press 200 in open configuration, the powder building material 204 (in particular clay, but also could be cement material or recovery material containing ash, in any powder size that can range from fragments of several micrometer size to granules of several millimeter size) is introduced into the at least one cell 203 of the second mold 202 (advantageously multiple cells 203 are present and the powder building material 204 is introduced into all of them).

Also provided for is a feeding step, in which the pressurized fluid is supplied into the compensation circuit 9 by the feeding means 10 in order to form pockets 11 of pressurized fluid at at least part of the recesses 8 of the compaction surface 6.

Advantageously, the loading step can occur before, simultaneously or after the feeding step.

The present process also comprises a pressing step, in which the press 200 is actuated from the open configuration to the closed configuration, in which the compaction surface 6 of the compaction body 5 of the isostatic punch 1 press the powder building material 204 in the cell 203 of the second mold 202 in order to form the tile 100. More in detail, during the pressing step, the projections 7 of the compaction surface 6 press the aforesaid building material 204 in the cell 203 of the second mold 202 in order to form the cavities 103 on the internal face 102 of the tile 100 and the recesses 8 of the aforesaid compaction surface 6 press such building material 204 in the cell 203 of the second mold 202 in order to form the feet 104 on the internal face 102 of the aforesaid tile 100, while in particular the cell 203 on the second mold 202 shapes the visible face 101 of the tile 100 itself. In such pressing step, the pressurized fluid in the pockets 11 increases the compression exerted, on the powder building material 204 (e.g. clay), by the compaction surface 6 at the recesses 8 for forming feet 104 and the pressurized fluid is redistributed in the compensation circuit 9 from pocket 11 to pocket 11 in order to make uniform the compression exerted by the compaction surface 6 at the recesses 8.

In particular, the pressing step follows the loading step and the feeding step.

More in detail, such process has the advantage of allowing the production of tiles 100 which are provided with a visible face 101 and with an opposite internal face 102 (at which the tile 100 is intended to be fixed to a building wall), and, on such internal face 102, the cavities 103 and the projecting feet 104 that delimit the cavities 103 are made, in which the tile 100 is provided with a first thickness D1 from visible face 101 to internal face 102 at the feet 104 which is greater than 50% or more than a second thickness D2 from visible face 101 to internal face 102 at the cavities 103.

Such process therefore, allowing the production of tiles 100 with a first thickness D1 at the feet 104 that is so high with respect to the second thickness D2 at the cavities 103, reduces the costs tied to the production of the tiles 100, since it reduces the mass and increases the ratio between void volume and solid volume (in which the void and solid volumes are expressed as percentage over the overall bulk volume of the same tile 100) of the tiles 100 and, therefore, reduces the quantity of building material 204 (e.g. clay) necessary for each tile 100.

The present process advantageously also comprises a discharge step, in which the tile 100 is extracted from the cell 203 of the second mold 202 of the press 200, a drying step, in which the tile 100 is dried, and a firing step, in which the tile 100 itself is fired.

In particular, the process according to the invention has the advantage that the steps of drying and firing require particularly low energy consumptions, since the tile 100 formed is, as explained above, provided with a reduced mass and with a high ratio between void volume and solid volume (of course the energy spent in the step of firing tiles 100 with lower mass is lower than the energy spent in the step of firing a tile with higher mass).

In addition, the fact that the tile 100 formed by means of the process according to the invention is provided with a first thickness D1 that is so high at the feet 104 ensures that, during the drying and firing steps, the air can more easily circulate at the cavities 103 (given that the feet 104 are high, the bottom of the cavities 103 is spaced from the shelves or from the advancing means on which the tile 100 itself rests by means of the feet 104) and hence the humidity exchange rate is increased during the drying step and the heat exchange rate is increased during the firing step and, consequently, the energy consumptions of such drying and firing steps are further reduced.

Preferably, the present process comprises a filling step, in which doses of filler material 108 (e.g. a sound-absorbent material and/or thermal insulation material and/or dehumidifying material and/or refractory material) are inserted in containment volumes 106 delimited by the feet 104 of the tile 100.

In particular, this filling step is possible since the tile 100 has the first thickness D1 at the feet 104 particularly high with respect to the second thickness D2 at the cavities 103, in a manner such that the feet 104 between them define containment volumes 106 that are sufficiently spacious to receive corresponding doses of filler material 108.

Therefore, the aforesaid present process allows attaining tiles 100 adapted to constitute the insulation (against the exchange of heat and/or sound) and/or fireproof covers on building walls, since it is provided with the aforesaid doses of filler material 108, e.g. sound-absorbent material and/or thermal insulation material and/or dehumidifying material and/or refractory material.

In this manner, by means of the tiles 100 obtained from the present process, it is possible to attain the insulation and/or fireproof covers on the building walls of a building in a simple and quick manner, given that it is sufficient to fix the tiles 100 thus produced directly to the building wall without requiring the previous installation of insulation and/or fireproof layers or panels.

In addition, given that the doses of filler material 108 are directly integrated in the containment volumes 106 between the feet 104 of the tile 100, it is possible to attain insulation and/or fireproof covers that are particularly thin, which can therefore be placed on the building walls of internal settings of a building without overly reducing the space in the aforesaid internal settings.

Otherwise, with respect to the covers for building walls, which are advantageously attained with ceramic tiles 100 obtained starting from clay and attained by means of the present process, it is possible to employ the tiles 100 obtained by means of the present process also for covering walkways, sidewalks, terraces and the like, in particular if such tiles 100 were obtained starting from a cement material.

Advantageously, the projecting portions 7 and the recesses 8 of the compaction surface 6 are rounded in a manner such that, in the pressing step, the feet 104 of the tile 100 that is formed are compacted by the projecting portions 7 contiguous with the respective recess 8 also at a lateral surface 105 of the same feet 104.

In particular, the arrangement of projecting portions 7 and rounded recesses 8 ensures that the feet 104 are extended starting from their base portion 109 with a lateral surface 105 that is substantially frustoconical and terminate with their tip portions 110 having rounded form.

In this manner, the present process also ensures that the feet 104 (which are subjected in the processes of the prior art to a compression much lower than that of the cavities) are subjected to a compression similar to that of the cavities 103 of the tile 100, given that not only the compensation circuit 9 is extended at the recesses 8 in order to allow the formation of pockets 11 of fluid at the same recesses 8 which increase the compression to which the feet 104 are subjected, but also the rounded projections 7 laterally exert a compression thereon.

Advantageously, the compaction body 5 is provided with an interface surface 12 directed towards the bottom wall 4 of the containment tank 3 and placed at least partially to delimit the compensation circuit 9, in a manner such that, in the feeding and pressing steps, the pressurized fluid deforms the compaction body 5 forming the pockets 11 of pressurized fluid (more in detail directly) on the interface surface 12.

More in detail, the isostatic punch 1 employed in the present process comprises a rigid plate 13, placed within the compaction body 5, integral with the support body 2 (e.g. since it is fixed by means of fixing screws 19 to the bottom wall 4), spaced from the bottom wall 4 (e.g. by means of spacer elements 20 interposed between the plate 13 itself and the bottom wall 4 and, in particular, traversed by the fixing screws 19) and provided with a first face 14, which is placed in contact with the interface surface 12 and is directed towards the compaction surface 6 of the compaction body 5, and with an opposite second face 15, which is directed towards the bottom wall 4. Additionally, the rigid plate 13 comprises advantageously multiple through holes 16, which are extended between the first and the second face 14, 15, are placed at least at the projecting portions 7 of the compaction surface 6 and are occupied by the elastically deformable material of the compaction body 5.

In addition, the compensation circuit 9 is extended advantageously between the first face 14 of the rigid plate 13 and the interface surface 12 of the compaction body 5 around the through holes 16.

In the feeding step, therefore, the pressurized fluid advantageously deforms the compaction body 5 by acting (more in detail directly) on the interface surface 12 forming the pockets 11 of pressurized fluid at first areas 17 on the first face 14 which are contiguous with the through holes 16 and corresponding to the recesses 8 of the compaction surface 6.

More in detail, therefore, the elastically deformable material of the compaction body 5 which occupies the through holes 16 of the plate 13 prevents the pressurized fluid which flows in the compensation circuit 9 during the feeding and pressing steps from flowing at the projections 7 but only in the first areas 17 adjacent to the aforesaid projections 7 and coinciding with the recesses 8 in order to form the pockets 11 at the latter.

Advantageously, the compensation circuit 9 is extended at a first group of recesses 8 of the compaction surface 6 and is not extended at a second group of recesses 8, in which the recesses 8 belonging to the second group are distributed in an ordered manner with respect to the recesses 8 belonging to the first group (e.g. the recesses 8 are distributed along lines and columns and the recesses 8 belonging to the first group are alternated with the recesses 8 belonging to the second group both along the lines and along the columns, as schematized for example by the distribution of the through holes 16 on the plate 13 depicted in FIG. 3).

In addition, in the pressing step, the feet 104 on the internal surface 102 of the tile 100 that is formed corresponding to the second group of recesses 8 are subjected to a compression by the compaction surface 6 that is lower than that to which the feet 104 are subjected, corresponding to the first group of recesses 8.

This in particular involves that several of the feet 104 are less compressed and thus they can act as abutment points of the tile 100 on the movement means which carry the tile 100 itself by the press 200 employed in the present process to subsequent stations, such as for example that of drying, of firing and the like.

The invention thus conceived therefore attains the pre-established objects.

The invention claimed is:

1. Process for forming tiles (100), which is characterized in that it provides for:
- a step of arranging a press (200) provided with:
  - a first mold (201) carrying, mounted thereon, at least one isostatic punch (1);
  - a second mold (202), on which at least one cell (203) is obtained that is intended to receive a building material (204) made of powder;
- in which said press (200) is actuatable between an open configuration, in which said first mold (201) and said second mold (202) are spaced from each other, and a closed configuration, in which said first and second mold (201, 202) are placed against each other, with said isostatic punch (1) arranged for compacting said building material (204) made of powder in the cell (203) of said second mold (202) and forming a tile (100) provided with a visible face (101) and with an opposite internal face (102);
  - said isostatic punch (1) comprising:
    - a support body (2) in which a containment tank (3) is obtained that is delimited at least by a bottom wall (4);
    - a compaction body (5) made of elastically deformable material, placed in said containment tank (3) and having a compaction surface (6), which is opposite said bottom wall (4), is intended to come into contact with said building material (204) and is provided with:
      - a plurality of projecting portions (7) arranged for forming corresponding cavities (103) on the internal face (102) of said tile (100); and with
      - a plurality of recesses (8) interposed between said projecting portions (7) and arranged for forming corresponding feet (104) projecting on the internal face (102) of said tile (100);
    - a compensation circuit (9) placed within the containment tank (3) of said support body (2), interposed between the bottom wall (4) of the containment tank (3) of said support body (2) and the compaction surface (6) of said compaction body (5), and extended at at least part of the recesses (8) of said compaction surface (6);

feeding means (10) placed in fluid communication with said compensation circuit (9) in order to feed it with a pressurized fluid;

a loading step, in which, with said press (200) in said open configuration, said building material (204) made of powder is introduced into the cell (203) of said second mold (202);

a feeding step, in which said pressurized fluid is provided in said compensation circuit (9) by said feeding means (10) in order to form pockets (11) of pressurized fluid at at least said part of the recesses (8) of said compaction surface (6) of said compaction body (5);

a pressing step, in which said press (200) is actuated from said open configuration to said closed configuration, in which the compaction surface (6) of the compaction body (5) of said isostatic punch (1) press said building material (204) made of powder in the cell (203) of said second mold (202) in order to form said tile (100), said pressurized fluid in said pockets (11) increases a compression exerted, on said building material (204), by said compaction surface (6) at said recesses (8) for forming said feet (104) and said pressurized fluid is redistributed in said compensation circuit (9) from pocket (11) to pocket (11) in order to make uniform the compression exerted by said compaction surface (6) at said recesses (8).

2. Process according to claim 1, wherein the projecting portions (7) and the recesses (8) of the compaction surface (6) of said compaction body (5) are rounded in a manner such that, in said pressing step, the feet (104) of said tile (100) that is formed are compacted by the projecting portions (7) contiguous with the respective said recess (8) also at a lateral surface (105) of the same said feet (104).

3. Process according to claim 1, wherein said compaction body (5) is provided with an interface surface (12) directed towards the bottom wall (4) of the containment tank (3) of said support body (2) and placed at least partially to delimit said compensation circuit (9);

wherein, in said feeding and pressing steps, said pressurized fluid deforms said compaction body (5) forming said pockets (11) of pressurized fluid on said interface surface (12).

4. Process according to claim 3, wherein said isostatic punch (1) comprises a rigid plate (13), placed within said compaction body (5), integral with said support body (2), spaced from said bottom wall (4) and provided with a first face (14), which is placed in contact with the interface surface (12) and is directed towards the compaction surface (6) of said compaction body (5), and with an opposite second face (15), which is directed towards said bottom wall (4);

said rigid plate (13) comprising multiple through holes (16), which are extended between said first and second face (14, 15), are placed at least at the projecting portions (7) of the compaction surface (6) of said compaction body (5) and are occupied by the elastically deformable material of said compaction body (5);

said compensation circuit (9) being extended between the first face (14) of said rigid plate (13) and the interface surface (12) of said compaction body (5) around said through holes (16);

wherein, in said feeding step, said pressurized fluid deforms said compaction body (5) by acting on said interface surface (12), forming said pockets (11) of pressurized fluid at first areas (17) on said first face (14) which are contiguous with said through holes (16) and corresponding to the recesses (8) of said compaction surface (6).

5. Process according to claim 1, wherein said compensation circuit (9) is extended at a first group of recesses (8) of the compaction surface (6) of said compaction body (5) and is not extended at a second group of recesses (8) of said compaction surface (6);

wherein, in said pressing step, the feet (104) on the internal surface (102) of said tile (100) that is formed, corresponding to said second group of recesses (8), are subjected to compression by said compaction surface (6) that is lower than that to which the feet (104) corresponding to said first group of recesses (8) are subjected.

* * * * *